June 16, 1936.  J. R. COLLYEAR  2,044,420

FREEWHEEL DRIVING MECHANISM

Filed Feb. 26, 1936

INVENTOR
John R. Collyear
BY
E. F. Wenderoth
ATTORNEY

Patented June 16, 1936

2,044,420

UNITED STATES PATENT OFFICE 2,044,420

FREEWHEEL DRIVING MECHANISM

John Robert Collyear, Leverno, Bushey, England, assignor of one-half to Thomas George Baxenden, Watford, England Application February 26, 1936, Serial No. 65,910
In Great Britain August 14, 1934

5 Claims. (Cl. 74—7)

This invention comprises improvements in free wheel mechanism of the type (hereinafter referred to as the type described) in which a spring coupling rotatable driving and driven members for transmission of the drive in one direction, is arranged to tend to tighten itself, on rotation of the driving member in the forward direction, against one of the members and thereby to transmit the drive by frictional engagement therewith and to slacken its grip on rotation of the driving member in the reverse direction and is provided with a trip device operable automatically on backward movement of the driven member in relation to said device to release the driving grip of the spring and thereby permit rotation of the driven member in a backward direction in relation to the driver. Examples of free wheel mechanisms of this type are to be found in the specification of Patent No. 2,004,650 and in the specification of application for patent Serial No. 48,764 filed 7th November 1935.

It is found in free wheel mechanism of the type described that if the spring is made sufficiently strong to transmit a heavy load it is so stiff that unless it has a considerable initial frictional grip of the driving or driven member (which increases the friction when free wheeling) it sometimes fails to tighten itself on to the driving or driven member when the driving member is rotated in the driving direction. It is an object of the present invention to provide means replacing the spring which will transmit a heavy load and at the same time will, with certainty, tighten on to the driving or driven member on rotation of the driving member in the forward direction.

With this object in view the invention provides a free wheel mechanism of the type described in which the coupling spring is replaced by a plurality of split rings arranged face to face and interengaged in such manner that, on rotation of the driving member in the forward direction, they will tend to tighten themselves against either or both of the driving or driven members and thereby transmit the drive by frictional engagement therewith, and will tend to slacken their grip on rotation of the driving member in the reverse direction.

In one form of the invention the coupling spring is replaced by a plurality of co-axial split rings each provided at or near the gap between the ends of the ring with an extension in the axial direction of the ring arranged to fit in the gap of an adjacent ring, the rings being arranged to tend to tighten themselves by expansion, on rotation of the driving member in the forward direction, against one of the driving or driven members and thereby to transmit the drive by frictional engagement therewith and to slacken their grip on rotation of the driving member in the reverse direction. Preferably one ring is in fixed driving connection with the driving member and the individual rings decrease in stiffness as they become more remote in the axial direction from that ring.

A further object of the invention is to provide a free wheel mechanism of the type described which is particularly compact and is shorter than those hitherto proposed. With this object in view, in the preferred form of the mechanism, the driven member surrounds the driving member and one of the end rings is in rigid driving connection with the driving member and the rings are arranged to tend to tighten their external surfaces, by expansion of the rings, on rotation of the driving member in the forward direction, against the internal surface of the driven member.

One specific form of the invention as applied to a free wheel mechanism for connecting an electric self-starter motor with an internal combustion engine will now be described by way of example and with reference to the accompanying drawing in which:—

Figure 1:
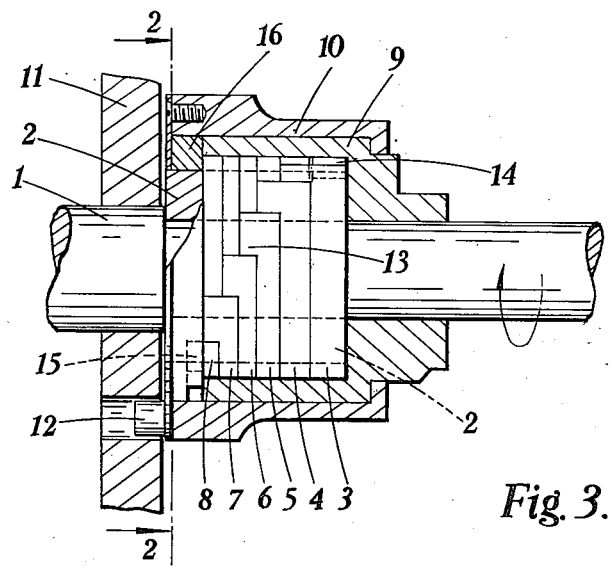
Figure 1 is a view partly in section of the mechanism.

In this form the free wheel mechanism comprises a unit surrounding, and keyed to, an extension on the self-starter motor shaft 1. The unit consists of a bush 2 (which is keyed to the motor shaft), a series of rings 3 to 8 later described, surrounding the bush 2 and, loosely fitted thereon, a sleeve 9 forming the driven member surrounding the rings and normally in light frictional engagement therewith, and a further sleeve 10 surrounding the driven member 9 and fixed against rotation with respect to the motor casing 11 by means of a screw head 12 engaging a hole in the motor casing.

Figure 3:
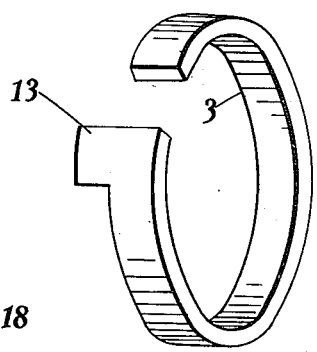
Figure 3 is a perspective view of one of the split rings employed.
Figure 2:
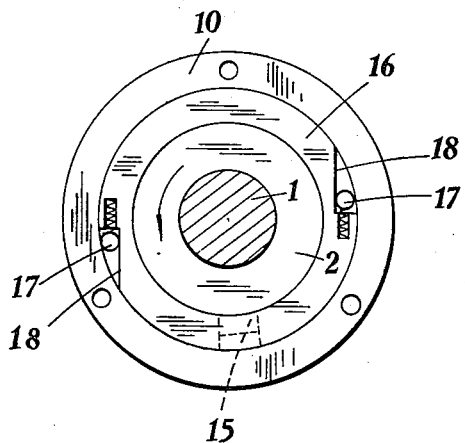
Figure 2 is a sectional end view on the line 2—2 of Figure 1.

Each ring of the series is in the form (shown in Figure 3) of a split circular ring of rectangular cross-section and has an extension 13 in the axial direction at that end of the ring which is behind the gap in the driving direction of rotation (shown by the arrow in Figures 1 and 2)—the gap between the ends of the ring being of length equal to the circumferential width of the extension. The rings are mounted coaxially, in contact, on the bush 2 and the extension 13 of each ring is inserted in the gap of the adjacent ring and is of length equal to the axial width of the adjacent ring. The rings are, in this example, all of the same diameter and radial thickness but they decrease in width as the series progresses along the bush towards the motor.

The ring 3 which is at the end of the series remote from the motor and which has no extension within its gap is keyed to the bush 2 by means of a key 14 on the bush inserted in the gap of the ring. The extension 15 on the ring 8 at the other end of the series is received within a radial slot cut in the ring 16 of a free wheel device of the kind in which a roller or rollers 17 (see Figure 2) tend to jam between an inclined surface 18 on the ring and a fixed member (in this case the outer sleeve 10), on rotation of the device in one direction only.

The driven member 9 is provided with a dog-coupling device of the usual type for engagement with a driving pinion (not shown) of the kind known under the registered trade name of "Bendix", which is mounted on the motor shaft.

On rotation of the motor shaft 1 in the driving direction the rings are carried round with the bush 2 by means of the key 14 engaging with the gap in the first and widest ring 3 and the projection in that ring engaging with the gap of the second ring and so on until the last ring rotates the free wheel device which is arranged for free rotation in this direction. The last ring 8, of the series, which is the least stiff, is in light frictional engagement with the internal surface of the driven member 9 and on rotation in this direction tends to expand and increase its grip on the driven member and thus to lag behind. This causes that end of the ring without the extension to engage with the extension on the adjacent ring 7 and to tend to expand that ring also and to draw it into engagement with the driven member. This action proceeds along the series (which in this case consists of 6 rings) until the last and stiffest ring 3 is expanded into frictional engagement with the driven member 9, when it alone transmits a considerable portion of the load.

Over-running rotation of the driven member 9 with respect to the driving shaft 1 is freely permitted since it merely tends to contract the rings out of engagement with the driven member.

In the event of backward rotation of the driven member (due, for example, to a backfire of the engine) backward rotation of the rings is prevented by the free wheel device which is in engagement with the projection on the narrowest end ring 8, and the rings are thereby prevented from expanding and completing the driving connection between the two members so that backward rotation of the driven member is also freely permitted.

It is to be appreciated that many modifications may be made in the particular example of the invention described above as, for example, the ball or roller free wheel device may be replaced by any other form of free wheel device, for example, a ratchet device or a spring as described in specification No. 2,004,650. In this latter case the ring 16 is replaced by a plain ring or sleeve in engagement with the extension on the ring 8 and the spring surrounds this plain ring and is arranged to prevent backward rotation thereof.

Further, a fly wheel may be incorporated in the mechanism to function in the manner described in specification No. 2,004,650 and this fly wheel may be provided by increasing the weight of the free wheel ring 16.

What I claim is:—

1. Free-wheel driving mechanism comprising a rotatable driving member, a rotatable driven member, a plurality of split rings arranged face to face coupling said members, said rings being interengaged and tending upon rotation of the driving member in the forward direction to tighten themselves against at least one of said members and transmit the drive by frictional engagement therewith and, on rotation of the driving member in the reverse direction, to slacken their grip, and trip means operable automatically on backward movement of the driven member in relation to said means to release the driving grip of the rings and thereby permit rotation of the driven member in a backward direction in relation to the driving member.

2. Free-wheel driving mechanism comprising a rotatable driving member, a rotatable driven member, a plurality of co-axial split rings arranged face to face coupling said members, an axial extension from each said ring arranged to fit in the gap of an adjacent ring, said rings tending, upon rotation of the driving member in the forward direction, to tighten themselves by expansion against at least one of the members and thereby to transmit the drive by frictional engagement therewith, and to slacken their grip on rotation of the driving member in the reverse direction, and trip means operable automatically on backward movement of the driven member in relation to said means to release the driving grip of the rings and thereby permit rotation of the driven member in a backward direction in relation to the driving member.

3. Free-wheel driving mechanism as claimed in claim 1 in which one of the rings is in fixed driving connection with the driving member and the individual rings decrease in stiffness as they become more remote in the axial direction from that ring.

4. Free-wheel driving mechanism as claimed in claim 2 in which one of the rings is in fixed driving connection with the driving member and the individual rings decrease in stiffness as they become more remote in the axial direction from that ring.

5. Free-wheel driving mechanism comprising a rotatable driving member, a rotatable driven member surrounding the driving member, a plurality of split rings arranged face to face coupling said members, a driving connection between one of the end rings and the driving member, said rings being interengaged and tending, upon rotation of the driving member in the forward direction, to tighten their external surfaces, by expansion of the rings against the internal surface of the driven member and thereby to transmit the drive, and, on rotation of the driving member in the reverse direction, to slacken their grip, and trip means operable automatically on backward movement of the driven member in relation to said means to release the driving grip of the rings and thereby permit rotation of the driven member in a backward direction in relation to the driving member.

JOHN ROBERT COLLYEAR.